(12) United States Patent
Simon et al.

(10) Patent No.: US 7,160,516 B2
(45) Date of Patent: Jan. 9, 2007

(54) HIGH VOLUME ULTRASONIC FLOW CELL

(75) Inventors: William P. Simon, New Milford, CT (US); John Massa, Danbury, CT (US); Robert J. Posca, Danbury, CT (US)

(73) Assignee: Sonics & Materials, Inc., Newtown, CT (US)

( * ) Notice: Subject to any disclaimer, the term of this patent is extended or adjusted under 35 U.S.C. 154(b) by 631 days.

(21) Appl. No.: 10/277,327

(22) Filed: Oct. 22, 2002

(65) Prior Publication Data
US 2004/0022695 A1  Feb. 5, 2004

Related U.S. Application Data

(60) Provisional application No. 60/399,626, filed on Jul. 30, 2002.

(51) Int. Cl.
*B06B 1/00* (2006.01)
(52) U.S. Cl. ............... 422/128; 366/127; 422/127; 422/256
(58) Field of Classification Search ........... 422/128, 422/44, 45, 47, 49, 127, 20, 257, 256; 366/DIG. 4, 366/127; 576/181; 204/157.15; 210/748; 601/2; 604/22
See application file for complete search history.

(56) References Cited

U.S. PATENT DOCUMENTS

| | | | |
|---|---|---|---|
| 3,715,104 A | 2/1973 | Cotell | |
| 3,825,481 A | 7/1974 | Supitilov | |
| 3,972,614 A | 8/1976 | Johansen et al. | |
| 4,016,436 A | 4/1977 | Shoh | |
| 4,134,678 A | 1/1979 | Brown et al. | |
| 4,266,879 A | 5/1981 | McFall | |
| 4,731,227 A | 3/1988 | Pulvari | |
| 4,764,021 A | 8/1988 | Eppes | |
| 5,026,167 A * | 6/1991 | Berliner, III | 366/173.1 |
| 5,912,182 A | 6/1999 | Coakley et al. | |
| 5,988,396 A | 11/1999 | Minkara et al. | |
| 6,200,486 B1 | 3/2001 | Chahine et al. | |
| 6,257,510 B1 | 7/2001 | Schuck | |

* cited by examiner

Primary Examiner—Krisanne Jastrzab
(74) Attorney, Agent, or Firm—St. Onge Steward Johnston & Reens LLC

(57) ABSTRACT

A flow cell for the ultrasonic treatment of a liquid includes a housing with a wall at least partially defining a flow chamber therein. The housing includes a first liquid passage and a second liquid passage for flowing the liquid into and out of the flow chamber. An ultrasonic horn extends into the flow chamber for imparting ultrasonic energy to liquid in the flow chamber, the ultrasonic horn having an outer surface and an end surface, and having a recess formed in the end surface. A tubular member having a first end in fluid communication with a second end, is arranged such that the first end is in fluid communication with the second liquid passage, and the second end extends into the recess in the ultrasonic horn.

21 Claims, 4 Drawing Sheets

HIGH VOLUME ULTRASONIC FLOW CELL

RELATED APPLICATIONS

This patent application claims the benefit of, under Title 35, United States Code, Section 119(e), U.S. Provisional Patent Application No. 60/399,626, filed Jul. 30, 2002.

FIELD OF THE INVENTION

The present invention relates generally to a flow cell for the ultrasonic treatment of a liquid passing therethrough, and more particularly to such a flow cell which advantageously provides an increased efficiency and/or throughput of the flow cell.

BACKGROUND OF THE INVENTION

The treatment of various liquids by ultrasonic energy is well known. Ultrasonic energy has proven to be an effective means for homogenizing, dispersing, blending, mixing and reducing particles in one or more liquids, as well as for expediting certain chemical reactions. It is also well known that horn resinators can be employed to concentrate ultrasonic energy. U.S. Pat. Nos. 3,715,104 and 3,825,481 employ horn resonators to couple ultrasonic energy to the treated fluid which may comprise foods, medicaments, cosmetics and the like. Both of these patents teach sonic energy reactors in which the entire tapered horn resinator projects into a chamber through which flows the fluid being treated.

FIG. 1 illustrates an example of a conventional flow cell 10 employing a traditional horn 12, which flow cell 10 includes a housing 14 which defines a flow chamber 16. Housing 14 also includes an inlet 18 and an outlet 20 through which a liquid 22 to be treated is flowed (indicated by arrows). By varying the rate at which liquid 22 is flowed into and out of chamber 16 the level of liquid 22 within chamber 16, as well as the amount of time it spends within flow chamber 16, can be controlled. The end of horn 12 is immersed in liquid 22, and horn 12 is ultrasonically vibrated.

More specifically, an ultrasonic power supply (not shown) converts typical AC electricity to high frequency electrical energy. This electrical energy is transmitted to a piezoelectric transducer within a converter 24, where it is changed to mechanical vibrations in the ultrasonic range. The ultrasonic vibrations are intensified by horn 12 and focused at the tip. The ultrasonic activity of horn 12 imparts the vibration energy to liquid 22, thereby accomplishing the desired result within flow chamber 16. As these processes are well known, more detail is not provided herein.

Liquid 22 flows in front of horn 12 and is circulated through flow chamber 16. Due to the nature of the ultrasonic vibrations and the configuration of horn 12, the ultrasonic energy is generally concentrated at the tip of horn 12. However, ultrasonic energy is not limited to this area, and in fact, some degree of ultrasonic energy can be imparted to liquid 22 in substantially any area where liquid 22 contacts a surface of horn 12. As such, it is desirable to maximize the surface area of horn 12 which is in contact with liquid 22 so as to maximize the dwell time of liquid 22 within the ultrasonic field generated by horn 12 in order to maximize the flow rate of liquid 22 through flow chamber 16. A disadvantage of conventional flow cells, such as flow cell 10 shown in FIG. 1, is that the surface area of horn 12 which is in contact with liquid 22 is relatively small.

Attempts have been made to increase the surface area of the horn which is in contact with the liquid to be treated. FIG. 2 illustrates one such attempt wherein a bell horn 52 is used in conjunction with flow cell 50. Bell horn 52 includes an outer surface 54 and a recess 56 having an inner surface 58. Also, in this design, the inlet 60 is provided higher up along bell horn 52, while the outlet 62 is provided at the bottom of the flow chamber 64 defined by the housing 66. This configuration provides an advantage over the flow cell 10 illustrated in FIG. 1 in that the dwell time of the liquid 68 is increased because the ultrasonic energy of the sidewall of bell horn 52 is exploited in addition to the ultrasonic energy at the tip thereof. This radial ultrasonic energy increases the liquid's exposure path along the outside of bell horn 52.

Thus, liquid 68 is introduced though inlet 60 and along the outer surface 54 of bell horn 52 (indicated by arrows). Ultrasonic exposure begins along the side of bell horn 52 and is most intense at the face thereof just before liquid 68 exits through outlet 62 at the bottom of flow chamber 64. However, it should be noted that the inner surface 58 of bell horn 52 is generally not used for ultrasonic treatment of liquid 68. This is the case because although liquid 68 may initially at least partially fill recess 56 in bell horn 52 such that it contacts a portion of inner wall 58, air or various other gasses which may be dissolved in liquid 68 and caused to escape therefrom or which may be created by the ultrasonic treatment of liquid 68, will generally collect in recess 56, thereby causing the level of liquid 68 initially therein to drop until recess 56 is substantially filled with the air or gasses, and substantially no liquid 68 is located therein (as shown in FIG. 2).

Thus, no ultrasonic treatment of the liquid 68 can occur by operation of inner surface 58 unless flow chamber 64 can be turned on its side or inverted so that the air or gasses do not collect inside recess 56 of bell horn 52. However, in many cases it is not possible or desirable to place flow chamber 64 in these orientations. For example, if a catalyst material for a particular reaction is also present in the chamber or the operating environment does not allow the high voltage converter section to be on its side or up-side-down (e.g., because of safety and/or leakage concerns) it may be necessary that the typical orientation with the bell horn facing downward be maintained.

What is desired, therefore, is a flow cell for the ultrasonic treatment of a liquid passing therethrough which allows for a relatively high flow rate of the liquid therethrough, which provides a relatively high dwell time of the liquid within the ultrasonic field generated by the horn, which provides a relatively large surface in contact with the liquid to be ultrasonically treated, which employs a horn having an outer surface and a recess having an inner surface, both of which surfaces are used to impart ultrasonic energy to the liquid, and which allows the horn to be positioned with its recess facing downward.

SUMMARY OF THE INVENTION

Accordingly, it is an object of the present invention to provide a flow cell for the ultrasonic treatment of a liquid passing therethrough which allows for a relatively high flow rate of the liquid therethrough.

Another object of the present invention is to provide a flow cell for the ultrasonic treatment of a liquid passing therethrough which provides a relatively high dwell time of the liquid within the ultrasonic field generated by the horn.

A further object of the present invention is to provide a flow cell for the ultrasonic treatment of a liquid passing therethrough which provides a relatively large surface in contact with the liquid to be ultrasonically treated.

Still another object of the present invention is to provide a flow cell for the ultrasonic treatment of a liquid passing therethrough which employs a horn having an outer surface and a recess having an inner surface, both of which surfaces are used to impart ultrasonic energy to the liquid.

Yet a further object of the present invention is to provide a flow cell for the ultrasonic treatment of a liquid passing therethrough which allows the horn to be positioned with its recess facing downward.

These and other objects of the present invention are achieved by provision of a flow cell for the ultrasonic treatment of a liquid passing therethrough having a housing with flow chamber therein. The housing includes a first liquid passage and a second liquid passage. An ultrasonic horn extends into the flow chamber for imparting ultrasonic energy to liquid in the flow chamber, the ultrasonic horn having an outer surface and an end surface, and having a recess formed in the end surface. A tubular member extends into the recess in the ultrasonic horn so as to expose the liquid flow to both the inner and outer surfaces of the ultrasonic horn.

In another respect, a flow cell for the ultrasonic treatment of a liquid is provided, which flow cell includes a housing having an inner surface at least partially defining a flow chamber, a first liquid passage and a second liquid passage. An ultrasonic horn extends into the flow chamber and has an outer surface and an end surface. A recess is formed in the end surface, which recess has an inner surface. A tubular member extends into the recess in the ultrasonic horn. A first flow pathway is defined between the inner surface of the housing and the outer surface of the ultrasonic horn, a second flow pathway is defined between the inner surface of the recess of the ultrasonic horn and the outer surface of the tubular member, and a third flow pathway is defined by the inner surface of the tubular member. The first liquid passage is in fluid communication with the second liquid passage via the first flow pathway, the second flow pathway and the third flow pathway.

Preferably, the recess in the ultrasonic horn is oriented to face downward. It is also preferred that the first liquid passage is positioned in a side wall of the housing, and that the tubular member extends into the recess of the ultrasonic horn to an extent beyond the inlet. Most preferably, the recess in the ultrasonic horn has a depth, and the tubular member extends into the recess in the ultrasonic horn to an extent at least half of the depth of the recess. The second liquid passage is preferably positioned in a lower wall of the housing. Most preferably, the housing, the ultrasonic horn and the tubular member are coaxial with respect to each other. It is also most preferred that the ultrasonic horn comprise a bell horn.

The invention and its particular features and advantages will become more apparent from the following detailed description considered with reference to the accompanying drawings.

DETAILED DESCRIPTION OF AN EMBODIMENT OF THE INVENTION

Figure 1:
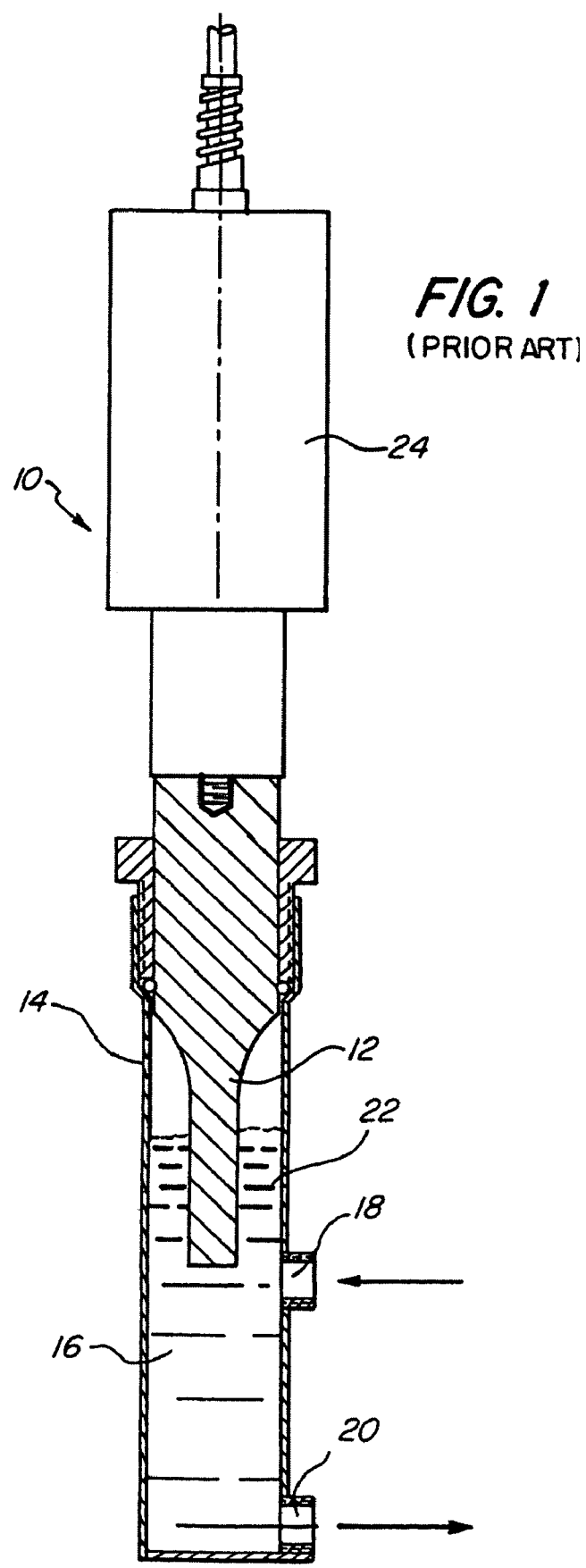
FIG. 1 is a partially cross-sectional view of a known flow cell having a conventional horn.
Figure 2:
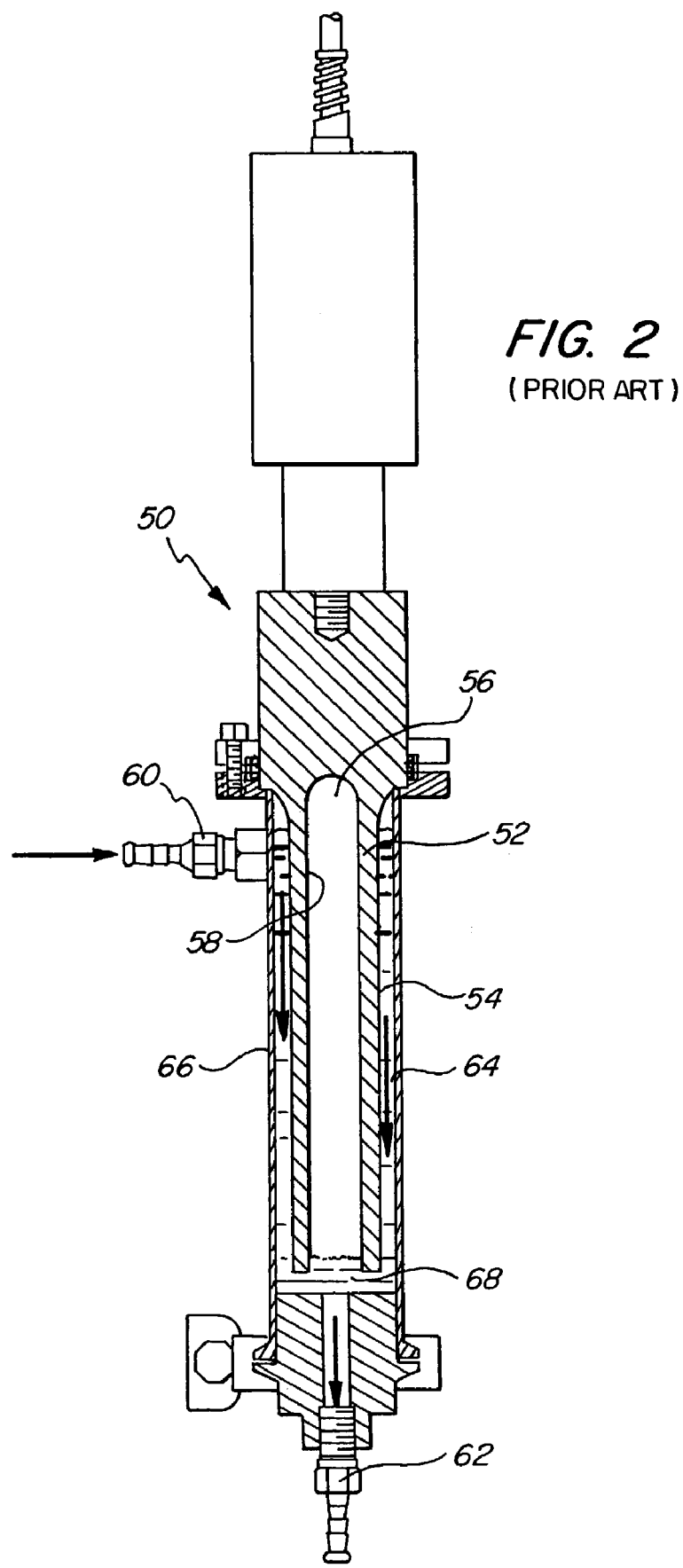
FIG. 2 is a partially cross-sectional view of a known flow cell having a bell horn.
Figure 3:
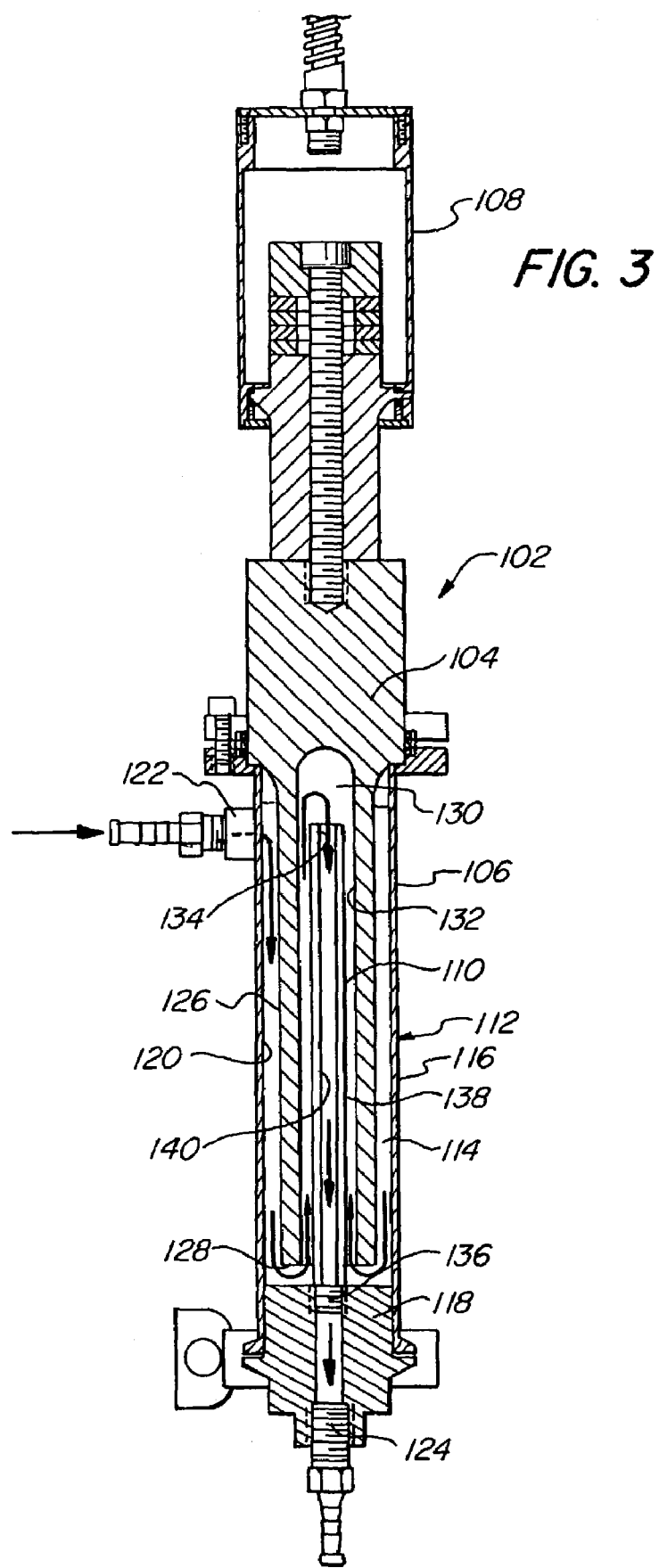
FIG. 3 is a partially cross-sectional view of a flow cell for the ultrasonic treatment of a liquid passing therethrough in accordance with an embodiment of the present invention; and, FIG. 4 is a partially cross-sectional view of portion of the flow cell for the ultrasonic treatment of a liquid passing therethrough of FIG. 3.

Referring now to FIG. 3, a flow cell 102 for the ultrasonic treatment of a liquid passing therethrough in accordance with an embodiment of the present invention is shown. The flow cell 102 is generally comprised of an ultrasonic horn 104, a housing 106, a converter 108 for vibrating horn 104, and a tubular member 110.

As discussed above, an ultrasonic power supply (not shown) converts typical AC electricity to high frequency electrical energy. This electrical energy is transmitted to a piezoelectric transducer within converter 108, where it is changed to mechanical vibrations in the ultrasonic range. The ultrasonic vibrations are intensified by ultrasonic horn 104 and focused at the tip. As these processes are well known, more detail is not provided herein.

Housing 106 generally comprises a wall 112 having an inner surface 120 at least partially defining a flow chamber 114 therein. Preferably, inner surface 120, and therefore flow chamber 114, are generally cylindrical in shape, although such a shape is not strictly required. Wall 112 may include a side wall portion 116 and a lower wall portion 118. Housing 106 also includes a first liquid passage 122 and a second liquid passage 124 for flowing the liquid into and out of flow chamber 114. It should be understood that first liquid passage 122 may be an inlet and second liquid passage 124 may be an outlet (as shown in the Figures), or vice versa such that the liquid may flow in either direction. First liquid passage 122 is preferably formed in side wall portion 116, most preferably toward the top thereof, while second liquid passage 124 is preferably formed in lower wall portion 118.

Ultrasonic horn 104, which extends into flow chamber 114 for imparting ultrasonic energy to liquid in flow chamber 114, has an outer surface 126 and an end surface 128. A recess 130 is formed in the end surface 128 of ultrasonic horn 104 and extends thereinto, which recess is defined by an inner surface 132. Preferably, ultrasonic horn 104 and recess 130 therein are sized and shaped such that ultrasonic horn 104 defines an elongated hollow portion. Ultrasonic horn 104 is disposed within flow chamber 114 such that outer surface 126 of ultrasonic horn 104 is spaced from inner surface 120 of housing 106.

Most preferably, outer surface 126 and inner surface 132 are generally cylindrical in shape such that ultrasonic horn 104 defines an elongated tubular portion. A horn having such a configuration is generally referred to as a bell horn. Recess 130 in ultrasonic horn 104 is preferably oriented to face downward, as shown in FIG. 3.

Tubular member 110 has a first end 136 in fluid communication with a second end 134, and has an outer surface 138 and an inner surface 140 extending therebetween. Tubular member 110 is arranged such that first end 136 thereof is in fluid communication with second liquid passage 124. Such may be accomplished, as shown in FIG. 3, by providing first end 136 of tubular member 110 and second liquid passage 124 with a cooperating set of threads, or by any other suitable attachment means. Second end 134 of tubular member 110 extends into recess 130 in ultrasonic horn 104, and is disposed within recess 130 such that outer surface 138 of tubular member 110 is spaced from inner surface 132 of ultrasonic horn 104.

Second end 134 of tubular member 110 may extend into recess 130 in ultrasonic horn 104 to substantially any degree, as at least some benefit of increased treatment area will be achieved so long as second end 134 extends at least slightly into recess 130. Stated another way, if one were to imagine end surface 128 of ultrasonic horn 104 as defining a generally horizontal plane, all that is required is for second end 134 of tubular member 110 to extend far enough into recess 130 to break this plane. Of course, the further tubular member 110 extends into recess 130, the greater the area of the liquid that will be in contact with a surface of ultrasonic horn 104. As such, it is desirable that second end 134 of the tubular member 110 extend into recess 130 to an extent vertically beyond the location of first liquid passage 122. Most desirably, second end 134 of the tubular member 110 extends into recess 130 at least halfway up the depth, and preferably further, of recess 130.

Preferably, although not necessarily, outer surface 138 and inner surface 140 of tubular member 110 are generally cylindrical in such, such that tubular member is generally configured as a hollow cylindrical tube. When such is the case, second liquid passage 124 is preferably positioned in lower wall portion 118 of housing 106 such that tubular member 110 is generally coaxial with second liquid passage 124. Most preferably, housing 106, ultrasonic horn 104, tubular member 110 and second liquid passage 124 are all generally coaxial.

Figure 4:
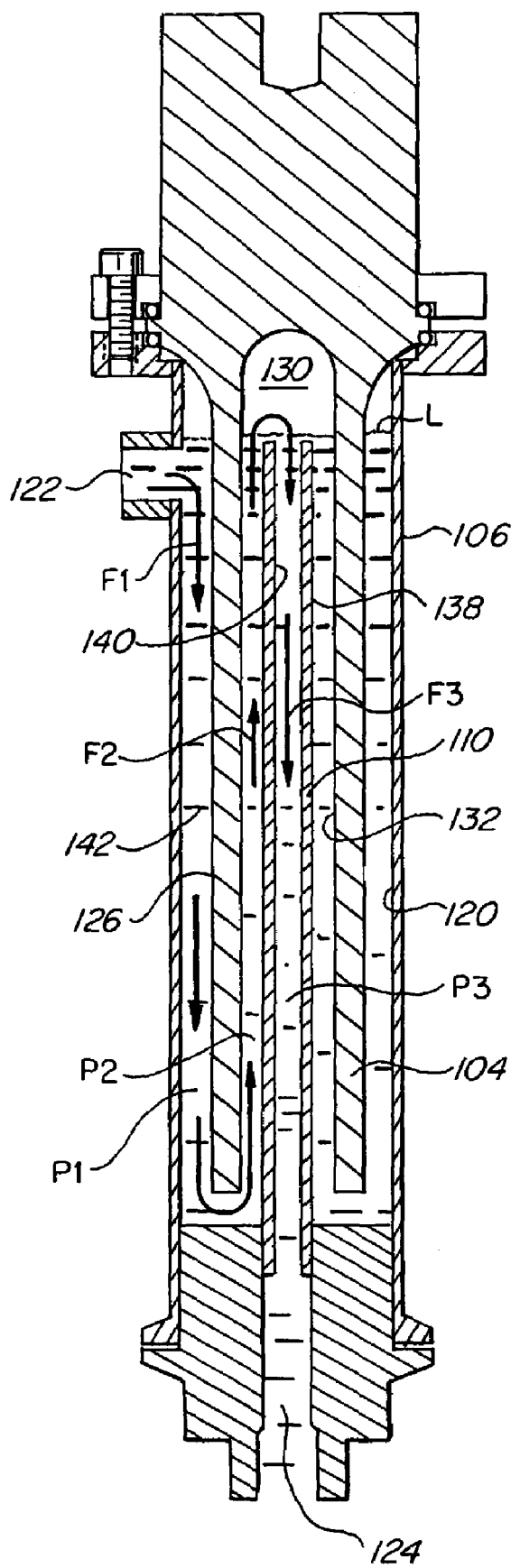

Referring now to FIG. 4, operation of flow cell 102 is shown in more detail. Liquid 142 enters flow cell 102 through first liquid passage 122 and flows (indicated by arrow F1) down through a first flow pathway (P1) defined between inner surface 120 of housing 106 and outer surface 126 of ultrasonic horn 104. At the lower end of housing 106, liquid 142 flows (indicated by arrow F2) around horn 104 and back up through a second flow pathway (P2) defined between inner surface 132 of recess 130 of ultrasonic horn 104 and outer surface 138 of tubular member 110. At the upper end of recess 130, liquid 142 flows (indicated by arrow F3) around tubular member 110 and back down through a third flow pathway (P3) defined by inner surface 140 of the tubular member 110. Thus, first liquid passage 122 is in fluid communication with second liquid passage 124 via first flow pathway (P1), second flow pathway (P2) and third flow pathway (P3). Of course, as mentioned above, the flow of liquid 142 could be reversed by introducing liquid 142 through second liquid passage 124 and exiting liquid 142 through first liquid passage 122.

As will be understood by those skilled in that art, the level (L) of liquid 142 within flow chamber 114, including the level of liquid 142 within recess 130, can be maintained slightly higher than second end 134 of tubular member 110. As such, liquid 142 is in contact not only with outer surface 126 of ultrasonic horn 104, as would be the case with the prior art, but is also in contact with a substantial portion of inner surface 132 thereof. As such, more ultrasonic energy is delivered to liquid 142 due to increased exposure area. It has been found that an approximately 20% increase in imparted energy can be expected. Furthermore, the dwell time for ultrasonic exposure is increased due to the increased path length. Yet another advantage of the present invention is a reduction in horn erosion. Increased dwell time means that an application can be processed at a reduced amplitude, which leads to reduced horn wear and a longer replacement cycle.

The present invention, therefore, provides a flow cell for the ultrasonic treatment of a liquid passing therethrough which allows for a relatively high flow rate of the liquid therethrough, which provides a relatively high dwell time of the liquid within the ultrasonic field generated by the horn, which provides a relatively large surface in contact with the liquid to be ultrasonically treated, which employs a horn having an outer surface and a recess having an inner surface, both of which surfaces are used to impart ultrasonic energy to the liquid, and which allows the horn to be positioned with its recess facing downward.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A flow cell for the ultrasonic treatment of a liquid, said flow cell comprising:
    a housing having a wall at least partially defining a flow chamber therein, said housing having a first liquid passage and a second liquid passage for flowing the liquid into and out of the flow chamber;
    an ultrasonic horn extending into the flow chamber for imparting ultrasonic energy to liquid in the flow chamber, said ultrasonic horn having an outer surface and an end surface, and having a recess formed in the end surface, the recess having an inner surface;
    a tubular member having a first end in fluid communication with a second end, the first end of said tubular member being in fluid communication with the second liquid passage, and the second end of said tubular member extending into the recess in said ultrasonic horn; and
    the first liquid passage is positioned in an upper portion of said wall and is above the end surface of said ultrasonic horn and the recess in said ultrasonic horn is oriented to face downward;
    whereby liquid is forced to flow past both the outer surface and the inner surface of said ultrasonic horn as the liquid flows through the flow chamber.

2. The flow cell of claim 1 wherein the first liquid passage is positioned in a side wall of said housing, and wherein the second end of said tubular member extends into the recess of said ultrasonic horn to an extent beyond the first liquid passage.

3. The flow cell of claim 1 wherein the first liquid passage is positioned in a lower wall of said housing.

4. The flow cell of claim 1 wherein said housing, said ultrasonic horn and said tubular member are coaxial with respect to each other.

5. The flow cell of claim 1 wherein the recess in said ultrasonic horn has a depth, and the second end of said tubular member extends into the recess in said ultrasonic horn to an extent at least half the depth of the recess.

6. The flow cell of claim 1 wherein said ultrasonic horn comprises a bell horn.

7. A flow cell for the ultrasonic treatment of a liquid, said flow cell comprising:
    a housing having a wall at least partially defining a flow chamber therein, said housing having a first liquid passage and a second liquid passage for flowing the liquid into and out of the flow chamber;
    an ultrasonic horn extending into the flow chamber for imparting ultrasonic energy to liquid in the flow chamber, said ultrasonic horn having an outer surface and an end surface, and having a recess formed in the end surface, said end surface defining a generally horizontal plane;

a tubular member having a first end in fluid communication with a second end, the first end of said tubular member being in fluid communication with the second liquid passage, and the second end of said tubular member extending into the recess in said ultrasonic horn beyond the generally horizontal plane defined by the end surface of said ultrasonic horn, whereby liquid is forced to flow at least partially into the recess in said ultrasonic horn as the liquid flows through the flow chamber; and, the first liquid passage is positioned in an upper portion of said wall and is above the end surface of said ultrasonic horn and the in said ultrasonic horn is oriented to face downward, whereby liquid is forced to flow past the outer surface of said ultrasonic horn as the liquid flows through the flow chamber.

8. The flow cell of claim 7 wherein the first liquid passage is positioned in a side wall of said housing, and wherein the second end of said tubular member extends into the recess of said ultrasonic horn to an extent beyond the first liquid passage.

9. The flow cell of claim 7 wherein the second liquid passage is positioned in a lower wall of said housing.

10. The flow cell of claim 7 wherein said housing, said ultrasonic horn and said tubular member are coaxial with respect to each other.

11. The flow cell of claim 7 wherein the recess in said ultrasonic horn has a depth, and the second end of said tubular member extends into the recess in said ultrasonic horn to an extent at least half the depth of the recess.

12. The flow cell of claim 7 wherein said ultrasonic horn comprises a bell horn.

13. A flow cell for the ultrasonic treatment of a liquid, said flow cell comprising:

a housing having an inner surface at least partially defining a flow chamber, said housing having a first liquid passage and a second liquid passage for flowing the liquid into and out of the flow chamber;

an ultrasonic horn extending into the flow chamber, said ultrasonic horn having an outer surface and an end surface, and having a recess formed in the end surface, said recess having an inner surface;

a tubular member having a first end in fluid communication with a second end and having an outer surface and an inner surface, the first end of said tubular member being in fluid communication with the second liquid passage, and the second end of said tubular member extending into the recess in said ultrasonic horn;

the first liquid passage is positioned in an upper portion of said wall and is above the end surface of said ultrasonic horn and the recess in said ultrasonic horn is oriented to face downward, whereby liquid is forced to flow past the outer surface of said ultrasonic horn as the liquid flows through the flow chamber;

a first flow pathway defined between the inner surface of said housing and the outer surface of said ultrasonic horn;

a second flow pathway defined between the inner surface of the recess of said ultrasonic horn and the outer surface of said tubular member;

a third flow pathway defined by the inner surface of said tubular member; and wherein said first liquid passage is in fluid communication with said second liquid passage via said first flow pathway, said second flow pathway and said third flow pathway.

14. The flow cell of claim 13 wherein the first liquid passage is positioned in a side wall of said housing, and wherein the second end of said tubular member extends into the recess of said ultrasonic horn to an extent beyond the first liquid passage.

15. The flow cell of claim 13 wherein the second liquid passage is positioned in a lower wall of said housing.

16. The flow cell of claim 13 wherein said housing, said ultrasonic horn and said tubular member are coaxial with respect to each other.

17. The flow cell of claim 13 wherein the recess in said ultrasonic horn has a depth, and the second end of said tubular member extends into the recess in said ultrasonic horn to an extent at least half the depth of the recess.

18. The flow cell of claim 13 wherein said ultrasonic horn comprises a bell horn.

19. The flow cell of claim 1 wherein said first liquid passage comprises an inlet and wherein said second liquid passage comprises an outlet.

20. The flow cell of claim 7 wherein said first liquid passage comprises an inlet and wherein said second liquid passage comprises an outlet.

21. The flow cell of claim 13 wherein said first liquid passage comprises an inlet and wherein said second liquid passage comprises an outlet.

* * * * *